L. D. LOVEKIN.
EXPANSIBLE WASHER.
APPLICATION FILED MAY 28, 1919.

1,344,417.

Patented June 22, 1920.

WITNESS.
Gustav Genzlinger.

INVENTOR
Lucius D. Lovekin
BY
Francis D. Chambers
ATTORNEY

UNITED STATES PATENT OFFICE.

LUTHER D. LOVEKIN, OF ARDMORE, PENNSYLVANIA.

EXPANSIBLE WASHER.

1,344,417.     Specification of Letters Patent.     Patented June 22, 1920.

Application filed May 28, 1919. Serial No. 300,472.

*To all whom it may concern:*

Be it known that I, LUTHER D. LOVEKIN, a citizen of the United States, and a resident of Ardmore, county of Montgomery, State of Pennsylvania, have invented a certain new and useful Improvement in Expansible Washers, of which the following is a true and exact description, reference being had to the accompanying drawings, which form a part thereof.

My invention relates to the construction of expansible washers and has for its object to provide a washer which, after adjustment to desired thickness, will have its parts firmly secured in position and have the capacity for sustaining very heavy loads, and my invention, generally speaking, consists of a washer made up of two or more parts or members screwing into each other and so formed that two of said members shall present opposed faces to each other in the inside of the washer and a supplemental washer of fusible metal filling the space between said opposed faces and opposing any collapsing movement of the washer members. My invention also includes features of construction of the screw engaged washer members by which the pouring into plan of the supplemental washer member is facilitated and by which an interengagement of the supplemental and other washer members is provided for and other details of construction.

The nature of my improvements will be best understood as described in connection with the drawing, in which—

A indicates the flanged edge of an engine bed plate having a bolt hole A' formed through it for a holding down bolt. B indicates a supporting sole plate in which is formed a bolt hole B' in line with the hole A'. D is a faced off portion of the sole plate surrounding hole B' and affording a seat for the washer which is parallel to the under face of bed plate A. C is a holding down bolt and C' a nut screwing upon it. E indicates my expansible washer in its preferred form, made up of a part E' internally threaded, as shown at $E^3$, and having an inwardly extending annular portion indicated at $E^4$. $E^2$ indicates an externally threaded washer member screwing into member $E^1$, and having a face $E^5$ lying opposite to face $E^4$. $E^6$, $E^6$ indicate holes extending into the faces $E^4$ and $E^5$, and $E^7$, $E^7$, etc., indicate vent holes extending through the body of a washer member from the chamber formed between the two members. $E^8$ is a slot formed in member $E^2$ to afford a holding shoulder for a turning tool. F indicates a supplemental washer of fusible metal which is run into the space between the faces $E^4$ and $E^5$, and which converts the washer when in use into a practically solid washer.

Figure 3:
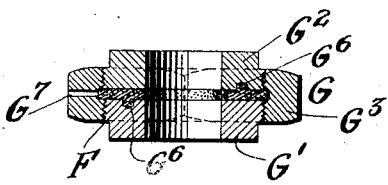
Fig. 3 is a sectional elevation of a modified form of my washer.

In the modification shown in Fig. 3 the expansible washer is indicated at G and is made up of two right and left threaded members G' and $G^2$ screwing into a sleeve nut $G^3$. Holes $G^6$ are formed in the opposed faces of members G' and $G^2$, and vent holes $G^7$ are provided, and, as in the other form of washer, a supplemental washer F is run into the space between G' and $G^2$.

Figure 1:
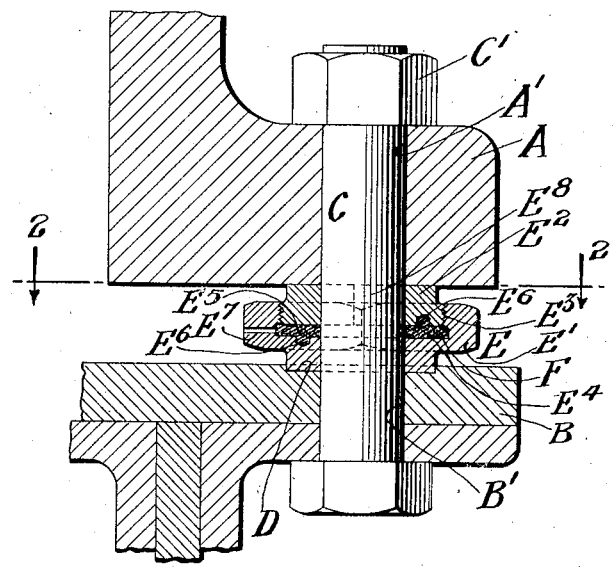
Figure 1 is a central sectional elevation of my washer shown as in use in supporting an engine bed plate on a sole plate.
Figure 2:
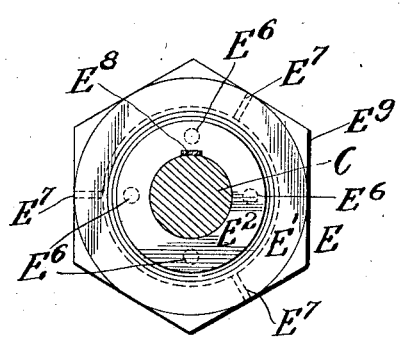
Fig. 2 is a plan view of my washer with a bolt passing through it shown in section.

In using my washer, as shown in Fig. 1, the bed plate is carefully alined above the supporting sole plate and a bolt hole A', B' formed through them, the sole plate is then faced off around the bolt hole, as shown at D, and the washer E, in collapsed position, is inserted and expanded to supporting position, as shown. Fusible metal is then poured into the interior of the washer filling the space between the faces $E^4$ and $E^5$, and the holes $E^6$ and a portion at least of slot $E^8$ where used, the vent holes $E^7$ permitting the air to escape freely. The bolt hole through parts A, B and washer E is then reamed out to form a body fit for the holding down bolt C.

In pouring the fusible metal into the washer the most satisfactory plan is to insert a plug in the hole B' and pour the metal through hole A', permitting it to fill not only the space between the opposed faces of the washer parts, but also some or all of the central passage through the washer.

The method of securing bed plates and sole plates, briefly indicated above forms the subject matter of my application filed May 28, 1919, Serial No. 300,471, and is not, therefore, claimed in this application.

It will be seen that the supplemental washer F, formed as above described, closes the space between the washer parts and forms a firm abutment for the opposed members which will prevent their approaching each other either by a turning movement or by strains, which tend to distort the threads, and, obviously, the interengagement of washer F with the washer members through the holes $E^6$ and slot $E^8$ will also tend to prevent any turning movement.

Having now described my invention, what I claim as new and desire to secure by Letters Patent is:

1. An annular washer consisting of relatively adjustable annular parts screwing together so as to permit of variations in the thickness of the washer, said washer having an internal space formed in it between adjustable parts thereof, and vent holes leading from said space through the body of a washer member.

2. An annular washer consisting of relatively adjustable annular parts screwing together so as to permit of variations in the thickness of the washer, said washer having an internal space formed in it lying between opposed faces of the adjustable parts thereof, and recesses extending from said internal space formed in the opposed faces of said parts.

3. An annular washer consisting of adjustable annular parts screwing together so as to permit of variations in the thickness of the washer, in combination with a supplemental annular washer of fusible metal filling the space between the adjustable parts.

4. An annular washer consisting of adjustable annular parts screwing together so as to permit of variations in the thickness of the washer, said washer being formed with vent holes leading from the annular space between its parts and said adjustable parts being so formed as to provide interlocking devices for a washer of fusible metal located between them, in combination with a supplemental annular washer of fusible metal filling the space between the adjustable parts and engaging the interlocking devices formed therein.

5. An annular washer consisting of adjustable annular parts screwing together so as to permit of variations in the thickness of the washer, said washer being formed with vent holes leading from the annular space between its parts and said adjustable parts being so formed as to provide interlocking recesses in their inner faces for a washer of fusible metal located between them, in combination with a supplemental annular washer of fusible metal filling the space between the adjustable parts and projecting into the interlocking recesses thereof.

6. An annular washer consisting of relatively adjustable annular parts screwing together so as to permit of variations in the thickness of the washer and the inner member or members being formed with a tool engaging slot in its inner periphery and the outer member with a wrench engaging outer surface, in combination with a supplemental annular washer of fusible metal filling the space between the adjustable parts of the washer.

LUTHER D. LOVEKIN.